Dec. 15, 1964     A. M. BIDERMAN     3,161,479
CLOTHES DRIER STATIC REMOVAL APPARATUS
Filed Aug. 31, 1960
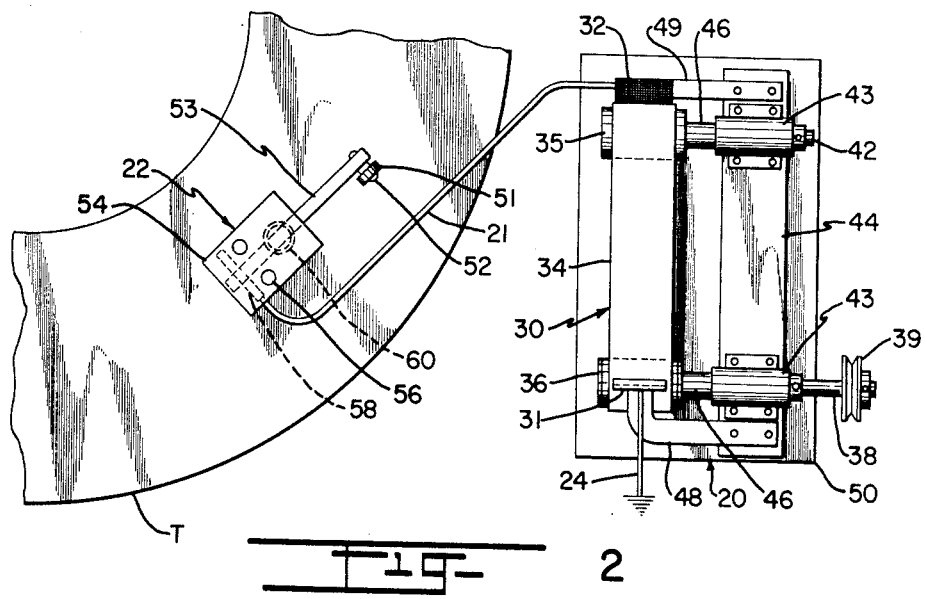
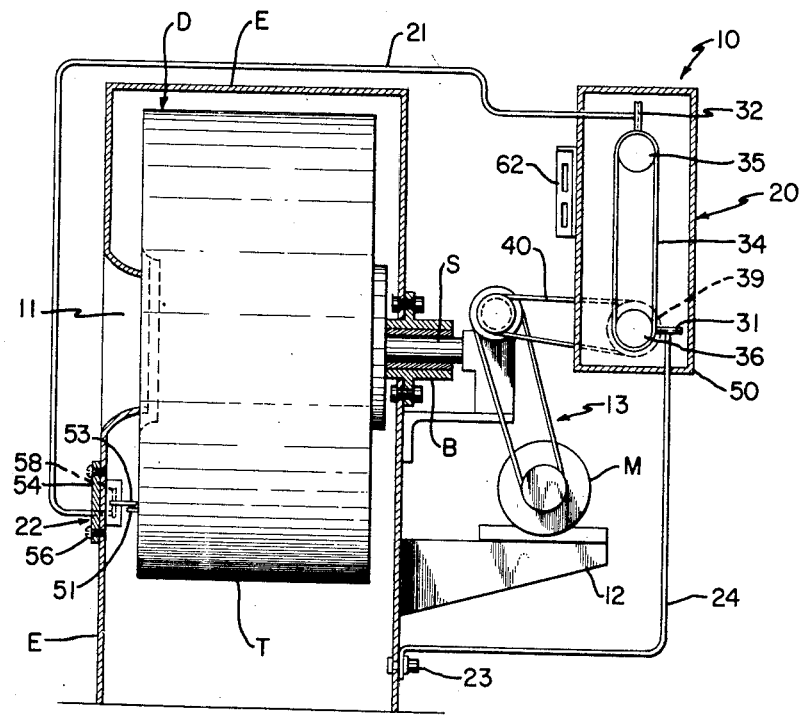
INVENTOR.
ADOLPH M. BIDERMAN
BY
Philip H. Sheridan
ATTORNEY

United States Patent Office 3,161,479
Patented Dec. 15, 1964

3,161,479
CLOTHES DRIER STATIC REMOVAL APPARATUS
Adolph M. Biderman, Littleton, Colo., assignor to Electro Development Co. Inc., Littleton, Colo., a corporation of Colorado
Filed Aug. 31, 1960, Ser. No. 53,116
2 Claims. (Cl. 34—1)

This invention relates to a novel method and means for neutralizing or discharging the electrostatic attraction between surfaces, and more particularly relates to a way of removing static attraction between frictionally engaging objects or surfaces, or objects contacting or contiguous to other electrically-charged surfaces, such as, in drying operations where lint and other foreign particles in the course of rotation become attracted to the clothing and tend to adhere thereto.

This invention has as its principal and foremost object the neutralization of opposing charges between moving surfaces or particles, and to a way of removing the static attraction therebetween, especially under circumstances causing undesirable attraction between objects, as for example in commercial dry cleaning or home drying operations.

It is another object of the present invention to provide for a novel method and means of discharging static electricity developed between moving surfaces causing them to be attracted to one another, and more specifically to provide for the generation of a high potential gradient static charge conducted in relation to the surfaces so as to have a neutralizing effect on the charge developed thereby to break down the attraction between the surfaces.

It is a further object to make provision for discharge of an electrostatic field normally operating to impede effective clothes drying operations and being caused by the development of static electricity due to friction between moving parts and surfaces, so that upon discharge it is possible to effect complete separation between the clothing being cleaned or dried and the lint or other foreign particles.

It is a still further object of the present invention to provide for a greatly improved and efficient dry cleaning operation which enables most effective and economical cleaning of the clothes, especially large-batch operations where it may be desirable to combine clothes of different colors while accomplishing the complete separation of lint and other foreign particles from the clothes.

It is an additional object to make provision for the application of an electrical charge of a single polarity and of the same characteristics as those of the electrostatic charge developed between adjacent surfaces created by the development of static electricity due to friction with the particular end in view of preventing adherence of lint and other foreign particles to clothing in drying operations.

In accordance with the present invention, it is proposed to break down the electrostatic attraction either between adjacent objects, particles or surfaces through the simple yet highly novel expedient of passing a charge of like characteristics and of single polarity into electrical association with such particles or surfaces and thus to enable the effective automatic separation between such surfaces as desired. This is of particular advantage and importance in clothes drying operations in the conventional tumbler type of clothes dryer to accomplish the removal of dirt and other undesirable particles, such as lint, from the clothing. Here, static charges of opposed, attracting polarity are developed by frictional contact between the clothing and foreign particles and that developed in the relatively moving parts by rotation of the dryer. As a consequence, it is exceedingly difficult to attain separation of the undesirable dirt and other particles, including lint from the clothing, since the clothing and particles are under continuous rotation or movement.

It has long been realized that it is the development of the static charge between adjacent surfaces which causes this electrostatic attraction and which substantially hinders effective cleaning of the clothing while drying, and, it has been customary to employ some type of voltage generating means in an effort to break down the attraction between the charged surfaces. Evidently the theory behind this has been to provide some way of bleeding or draining off the static charges as they are developed so as to overcome any tendency on the part of the foreign particles as they are removed from the clothing to become attracted thereto. To the best of my knowledge however, the mere practice of developing a high voltage electrical circuit, whether A.-C. or D.-C., in association with the particles has not been successful to any extent as a means of eliminating attraction between the surfaces and particles.

It has been discovered that the generation of a static charge, either negative or positive, can be successfully utilized to overcome the strength of attraction between the surfaces, particles etc. and is a highly effective and greatly simplified way of effectively breaking down this attraction. Specifically, therefore, it is the generation of a static charge of one polarity, and most desirably of a potential gradient greatly exceeding that existing between the surfaces and particles, which upon electrical association with such surfaces and particles is believed to attract charges of opposite polarity and repel charges of like polarity. It is further suspected that this to a great extent eliminates even the initial attraction between the surfaces by effectively removing charges developed in the moving parts of the tumbler by attraction of opposite charges which will essentially flow with the generator charges into ground.

The above and other objects, advantages and teachings of this invention will become more readily apparent from the following detailed description taken together with the accompanying drawings, in which:

FIGURE 1 is a somewhat schematic view illustrating the complete electrical circuit established between the static generating device and a conventional clothes dryer, in accordance with the present invention; and Figure 2 is a more detailed view illustrating a typical form of static generating apparatus employed in the present invention, and further illustrating the manner in which the static generating circuit may be connected into the revolving drum of a conventional clothes dryer.

Referring more particularly to the drawings, there is shown by way of illustrative example a preferred form of static electricity removal apparatus 10 which for purposes of illustration is shown electrically connected into a conventional drying unit D. The drying unit D may be representative of a home dryer, or a commercial dryer forming a part of dry cleaning installation, for example, and includes a tumbler T which is mounted on a main shaft S journaled in bearing B, the latter being supported together with the entire unit in an enclosure E. The tumbler T may take the form of a generally cylindrical housing keyed for rotation to the shaft and with a front access door 11 projecting forwardly through the enclosure E. For rotation of the shaft and tumbler, a suitable power source may be employed such as a motor M mounted on a stand 12 which through a conventional pulley and V-belt system 13 along with suitable gearing, not shown, may impart rotary movement to the shaft S.

Under rotation, the lint particles together with the other foreign particles have a tendency, due to the frictional contact made between the particles, clothing and the tumbler, to develop a static charge due to this friction. Of course, the static charge is made up of both negative and positive charges which will mutually attract one another and the particles with which they are associated, and the result is to make it very difficult to have complete separation between the foreign particles and the surfaces of the clothing. Moreover, in cleaning clothes of different colors an additional problem is involved in providing a static-free environment for the clothes such that there will be no tendency for the clothes to cling together as they are being cleaned such that fabric particles of one color will become attracted to the clothing of another color and cling thereto.

Accordingly, in the practice of the present invention, the static eletcricity removal apparatus 10 is preferably comprised of a static electricity charge generating device 20 having a flexible charge transmission wire 21 leading therefrom for connection into a conducting member 22 which in the form shown is supported for rotation in contact or close proximity with one end of the tumbler T. The entire dry cleaning unit D may be grounded for example through ground terminal 23 and the static generating device 20 may similarly be grounded through the ground transmission wire 24 leading from the device 20 into the terminal. In this way, a closed circuit is established between the static generating device 20 and the revolving tumbler so as to, in a manner to be described in more detail, establish a high potential, static generating charge through the conducting or drum surface of the tumbler.

As shown in detail in Figure 2, the static generating device 20 may take the form of a frictional belt drive unit 30, which operates on the well known Van de Graaff principle for developing a static charge, and includes a charge deposit brush 31 and a charge pick-up brush 32 to which the transmission wire 21 is connected. As an alternative, of course other means may be employed to develop the desired static charge, the primary objective being to develop a charge of one polarity, either positive or negative, for conduction through the tumbler. Furthermore, it is highly desirable to produce a high voltage or a high potential gradient across the tumbler not only to insure the constant application of the static charge there-through but also to insure that an excessive amount of charge will always be available to neutralize or attract charges of opposite polarity in electrical contact or association with the revolving tumbler. Accordingly, charge generating devices such as that of the Wimshurst type, may also be easily adopted. Referring in detail to the generating unit 20 of the present invention, it will be noted that the belt drive unit 30 includes an endless belt 34 of material capable of carrying the charge from the pick-up brush to the deposit brush, the belt being trained over a non-conductor pulley 35 and a conductor pulley 36. The conductor pulley 36 is keyed to a driving shaft 38 which by means of pulley 39 is rotated through an auxiliary V-belt 40 secured into the pulley drive 13 of the motor unit M. In turn, the non-conductor pulley 35 is keyed to driven shaft 42, and both the drive shaft 38 and driven shaft 42 may be mounted by means of ball-bearing pillow blocks 43 on a common bearing base 44. Spacers 46 of non-conducting material may be interposed between the ends of the pillow blocks 43 and pulleys 35 and 36 to maintain the belt drive unit in proper relation to the bearing blocks and base. Similarly, the charge deposit brush 31 may be secured by means of a non-conducting mounting bracket 48 to one end of the bearing base, and the charge pick-up brush positioned by means of another non-conducting mounting bracket 49 to the opposite end of the bearing base so that the brushes are in close relation with the belt 34 to respectively deposit and pick up charges developed as the belt is rotated at the desired speed by the drive shaft 38. The entire belt drive system forming the generating device may be enclosed within a housing 50 so as to prevent the entry of moisture, dust and other foreign particles.

To transfer the charge generated into the rotating dryer drum or tumbler T, as mentioned the transmission wire 21 is connected between the pick-up brush 32 and the conducting member 22 which is in contacting relation or close proximity with the end of the rotating drum. As illustrated, this member may be essentially defined by a ball-bearing roller 51 connected by roller pin 52 to arm 53 extending angularly toward the surface of the drum from a pivotal mounting plate 54. The mounting plate 54 is composed of a non-conducting material which is shown secured to the wall of the enclosure E by means of mounting screws 56 and the plate has a pivot pin 58 secured thereto for connection of the pivot arm 53. In order to urge the bearing roller against the end of the drum, a compression spring 60 is interposed between the inner surface of the mounting plate 54 and the arm 53 at an intermediate point therealong. Specifically, the transmission wire 21 is connected for example by means of solder into the pivot pin 58, since as stated the mounting plate 54 is of non-conducting material. In this way, the static charge generated is transferred directly through the pivot pin 58, arm 53 and pin 52 into the bearing roller 51 to be conducted through the rotating drum.

Since the drum itself is of some metallic material it will be electrically conductive for transfer of the charge through the drum then into the bearing portion B at the opposite end thereof and to ground terminal 23 through the enclosure E. Again the ground transmission wire 24 also extends from the deposit brush into the ground terminal 23 to establish a closed circuit for conducting the charge. This closed circuit through the rotating drum thus establishes a continuous path of flow for the static charge generated. The entire generating unit 20 may be mounted at any desired location and for example may be secured to the wall of the enclosure by bracket 62.

It can only be theorized that the generated charge, being of a single polarity either positive or negative, will attract opposite charges developed in operation of the dry cleaning unit so that only charges of like polarity will remain and will be mutually repulsive. In this way, it is believed that the generation of a static charge differs substantially from the mere generation of a high A.-C. or D.-C. voltage across the drum because, being of a particular polarity and of like characteristics with the charges developed in the tumbler will have a direct effect thereon so as to break down the attraction between the various particles and clothing. Similarly, the generation of static charges for transfer to the drum is believed to have a pronounced effect upon any charges developed due to friction between the moving parts in rotating the tumbler itself so as to prevent attraction between the surface of the drum and the clothing and thus enable free tumbling action of the clothes within the dryer for most effective cleaning.

It will be evident that rolling contact need not be maintained between the member 22 and the end of the drum in order to conduct the charges developed to the drum. For example, the member 22 may be spaced a limited distance from the drum to permit the charges to arc across the intervening space. In addition, means other than a roller may be utilized as the member 22, such as, a wire or metal brush either contacting the drum, or in close proximity thereto.

In the static generating device 20, it will be evident that the materials may be varied, and other modifications in construction may be adopted, it being the stated purpose of the generating device only to develop a high potential, electrostatic charge of a single polarity for conduction through the revolving drum in electrical association with the clothing therein. For example, the belt 34 may be composed of various materials to the end of creating a high potential static charge. Also, the deposit brush 31 and pick-up brush 32 may be of various materials, such as aluminum or brass, for transmitting the high potential charge from the belt. It will be further apparent that for example by connecting the static generating device into the power source for the dry cleaning unit, and under speeds of rotation on the order of 1,200 to 1,400 r.p.m., that a high potential charge can be developed in the device 20, and certainly in excess of the potential of the charge developed within the drum. Of course it is very difficult to precisely measure the voltage level or to define the potential of the charge necessary to effectively break down the attraction between charges within the drum. Suffice it to say, however, that rotation of the generating device is at a speed proportional to that of the drum so as to develop a sufficiently high potential gradient to insure effective operation of the system. In this connection, in practicing the present invention, it is believed to be advantageous to develop a negative charge in the generating device for conduction through the tumbler for effective neutralization of the attraction between the clothing and foreign particles. In any event the clearest indication of the effectiveness of the entire system is evidenced by the greatly increased amounts of foreign particles collected in the drying unit in the course of drying, accompanied by the absence of static attraction of the clothes as they are removed from the dryer.

While a preferred form of the present invention has been set forth in detail, it is to be understood that various modifications and changes in the construction, design, and choice of materials used may be made without departing from the scope of the method and apparatus of this invention, as defined by the appended claims and reasonable equivalents thereof.

What is claimed is:

1. Clothes drying apparatus comprising, in combination: static electricity discharging apparatus for neutralizing unwanted electrostatic attraction between moving surfaces in said apparatus; a rotatable drum for drying clothes including a conducting housing; a first electrode in movable contact with one side of said housing; a second electrode in contact with the other side of said housing; a belt drive for generating a high potential electrostatic charge including a belt, a deposit brush and a pick-up brush both connected to said belt; said first electrode being in electrical connection with said pick-up brush; a ground terminal connected to said second electrode; a ground connection between said deposit brush and said ground terminal to establish a closed circuit for the conduction of the high potential charge through the rotatable drum; and a motor drive unit for simultaneous rotation of said belt drive unit and the drum.

2. The apparatus of claim 1 in which said first electrode comprises an arm mounted adjacent said drum and pivoted at one end with a roller on the other end and spring biased to force said roller in rotary contact with said drum.

References Cited in the file of this patent
UNITED STATES PATENTS

| | | |
|---|---|---|
| 824,339 | Chapman | June 26, 1906 |
| 878,273 | Chapman | Feb. 4, 1908 |
| 1,394,211 | Morgan | Oct. 18, 1921 |
| 1,572,352 | Ewalt | Feb. 9, 1926 |
| 2,511,839 | Frye | June 20, 1950 |
| 2,807,948 | Bonney | Oct. 1, 1957 |
| 2,885,599 | Hand | May 5, 1959 |